US012603228B2

(12) United States Patent
Hirai

(10) Patent No.: US 12,603,228 B2
(45) Date of Patent: Apr. 14, 2026

(54) MULTILAYER CERAMIC CAPACITOR

(71) Applicant: Murata Manufacturing Co., Ltd., Nagaokakyo (JP)

(72) Inventor: Kenta Hirai, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 103 days.

(21) Appl. No.: 18/619,252

(22) Filed: Mar. 28, 2024

(65) Prior Publication Data

US 2025/0292966 A1 Sep. 18, 2025

(30) Foreign Application Priority Data

Mar. 13, 2024 (JP) ................................. 2024-038831

(51) Int. Cl.
| | |
|---|---|
| *H01G 4/30* | (2006.01) |
| *H01G 4/232* | (2006.01) |
| *H01G 4/008* | (2006.01) |
| *H01G 4/012* | (2006.01) |
| *H01G 4/12* | (2006.01) |

(52) U.S. Cl.
CPC ............. *H01G 4/30* (2013.01); *H01G 4/2325* (2013.01); *H01G 4/0085* (2013.01); *H01G 4/012* (2013.01); *H01G 4/1227* (2013.01); *H01G 4/1236* (2013.01)

(58) Field of Classification Search
None
See application file for complete search history.

(56) References Cited

U.S. PATENT DOCUMENTS

| | | | | |
|---|---|---|---|---|
| 11,670,457 B2 * | 6/2023 | Ishii | ....................... | H01G 4/008 |
| | | | | 361/321.2 |
| 11,901,128 B2 * | 2/2024 | Cha | ......................... | H01G 4/224 |
| 2016/0163461 A1 * | 6/2016 | Chen | ........................ | H01G 4/12 |
| | | | | 361/272 |
| 2018/0108482 A1 * | 4/2018 | Kogure | .................. | H01G 4/224 |
| 2020/0373087 A1 | 11/2020 | Kato | | |
| 2021/0159014 A1 * | 5/2021 | Kowase | .................... | H01G 4/33 |
| 2021/0166881 A1 * | 6/2021 | Kim | ....................... | H01G 4/012 |

(Continued)

FOREIGN PATENT DOCUMENTS

| | | | | |
|---|---|---|---|---|
| JP | 2001237137 A | | 8/2001 | |
| JP | 2019175936 A | * | 10/2019 | ........... H01G 4/1227 |

(Continued)

*Primary Examiner* — Dion R. Ferguson
(74) *Attorney, Agent, or Firm* — Keating & Bennett, LLP

(57) ABSTRACT

A multilayer ceramic capacitor includes a multilayer body including inner dielectric layers and internal electrode layers laminated therein, and external electrodes. Each of the inner dielectric layers includes a middle region at a middle portion and end regions at end portions in the length direction. A thickness of each of the inner dielectric layers is defined as Td, the middle region includes a first region with a dimension in the length direction of Td/2 and a dimension in the lamination direction of Td, and second regions adjacent to the first region with a dimension in the length direction of Td/2 and a dimension in the lamination direction of Td, the first region has a higher porosity than other regions, and a difference between a porosity in the first region and a porosity in each of the second regions is about 1% or more and about 5% or less.

18 Claims, 5 Drawing Sheets

(56)　　　　　References Cited

U.S. PATENT DOCUMENTS

| | | | | |
|---|---|---|---|---|
| 2021/0304969 A1* | 9/2021 | Ishii | .................... | H01G 4/1227 |
| 2021/0327649 A1* | 10/2021 | Muramatsu | ............. | H01G 4/30 |
| 2022/0208452 A1* | 6/2022 | Shin | ........................ | H01G 4/30 |
| 2022/0216008 A1* | 7/2022 | Kim | ........................ | H01G 4/30 |
| 2023/0141461 A1* | 5/2023 | Cha | .................... | H01G 4/1227 |
| | | | | 361/301.4 |
| 2023/0290574 A1* | 9/2023 | Park | .................... | H01G 4/1218 |
| 2023/0317375 A1* | 10/2023 | Morimoto | ............. | H01G 4/232 |
| | | | | 361/306.3 |
| 2024/0203650 A1* | 6/2024 | Oh | .......................... | H01G 4/30 |
| 2025/0218688 A1* | 7/2025 | Kim | .................... | H01G 4/1209 |
| 2025/0218691 A1* | 7/2025 | Hikida | ................... | H01G 4/012 |

FOREIGN PATENT DOCUMENTS

| | | | | | | |
|---|---|---|---|---|---|---|
| JP | | 2020088191 | A | * | 6/2020 | ........... H01G 4/2325 |
| JP | | 2020141016 | A | * | 9/2020 | ............ H01G 4/012 |
| JP | | 2020191330 | A | | 11/2020 | |
| JP | | 7562935 | B2 | * | 10/2024 | ........... H01G 4/1227 |
| KR | | 101508503 | B1 | * | 4/2015 | ............... H01G 4/30 |
| WO | WO-2012023334 | A1 | * | | 2/2012 | ............... H01G 4/12 |
| WO | WO-2024161970 | A1 | * | | 8/2024 | ............... H01G 4/30 |

* cited by examiner

MULTILAYER CERAMIC CAPACITOR

CROSS REFERENCE TO RELATED APPLICATIONS

This application is based on and claims the benefit of priority from Japanese Patent Application No. 2024-038831, filed on Mar. 13, 2024, the contents of which are incorporated herein by reference.

BACKGROUND OF THE INVENTION

1. Field of the Invention

The present invention relates to multilayer ceramic capacitors.

2. Description of the Related Art

In the related art, multilayer ceramic capacitors each include a multilayer body including dielectric layers and internal electrode layers that are alternately laminated, and dielectric layers that are laminated on an upper surface and a lower surface of the multilayer body, and a pair of external electrodes on both end surfaces of the multilayer body.

The multilayer ceramic capacitor is generally manufactured by alternately laminating a ceramic green sheet made of a dielectric ceramic such as barium titanate and an unfired internal electrode layer to form a green chip, firing the green chip, and then forming external electrodes on the both end surfaces of the obtained multilayer body.

However, in the process of manufacturing the multilayer body, when the green chip is fired, the dielectric ceramic shrinks and voids are generated in the dielectric layer. Further, since barium titanate is a high permittivity ceramic, stress is likely to be applied to a portion of the voids due to an electrostriction phenomenon at the time of the application of a voltage, and if the voids are concentrated in a specific portion in the dielectric layer, electrostriction cracks are generated at the portion, and the insulation resistance of the dielectric layer deteriorates, resulting in a decrease in reliability as a multilayer ceramic capacitor.

SUMMARY OF THE INVENTION

Example embodiments of the present invention provide highly reliable multilayer ceramic capacitors that are each able to reduce or prevent the generation of electrostriction cracks.

The inventor of preferred embodiments of the present invention have discovered that the incidence of electrostriction cracks is reduced by controlling the distribution of voids in the dielectric layer.

An example embodiment of the present invention provides a multilayer ceramic capacitor that includes a multilayer body including an inner layer portion including a plurality of inner dielectric layers and a plurality of internal electrode layers that are alternately laminated in a lamination direction, outer layer portions that sandwich the inner layer portion in the lamination direction, a first main surface and a second main surface opposed to each other in the lamination direction, a first lateral surface and a second lateral surface opposed to each other in a width direction orthogonal or substantially orthogonal to the lamination direction, and a first end surface and a second end surface opposed to each other in a length direction orthogonal or substantially orthogonal to the lamination direction and the width direction, and a pair of external electrodes covering at least the first end surface and the second end surface and being connected to the plurality of internal electrode layers, in which, when viewed in a cross section parallel or substantially parallel to the length direction and the lamination direction, each of the plurality of inner dielectric layers includes a middle region at a middle portion in the length direction and end regions at end portions in the length direction, and, when a thickness of each of the plurality of inner dielectric layers in the lamination direction is defined as Td, the middle region includes a rectangular or substantially rectangular region A1 in which a dimension in the length direction is defined as Td/2 and a dimension in the lamination direction is defined as Td and rectangular or substantially rectangular regions A2 each adjacent to the region A1 and in each of which a dimension in the length direction is defined as Td/2 and a dimension in the lamination direction is defined as Td, the region A1 has a higher porosity than other regions, and a difference between a porosity P1 in the region A1 and a porosity P2 in each of the region A2 is about 1% or more and about 5% or less.

According to example embodiments of the present invention, it is possible to provide highly reliable multilayer ceramic capacitors that are each able to reduce or prevent the generation of electrostriction cracks.

The above and other elements, features, steps, characteristics and advantages of the present invention will become more apparent from the following detailed description of the example embodiments with reference to the attached drawings.

BRIEF DESCRIPTION OF THE DRAWINGS

FIG. 4 is a schematic view of a structure of an inner layer portion of the multilayer ceramic capacitor shown in FIG. 1.

FIG. 5 is a schematic view of a distribution state of voids in a dielectric layer.

DETAILED DESCRIPTION OF THE EXAMPLE EMBODIMENTS

Figure 1:
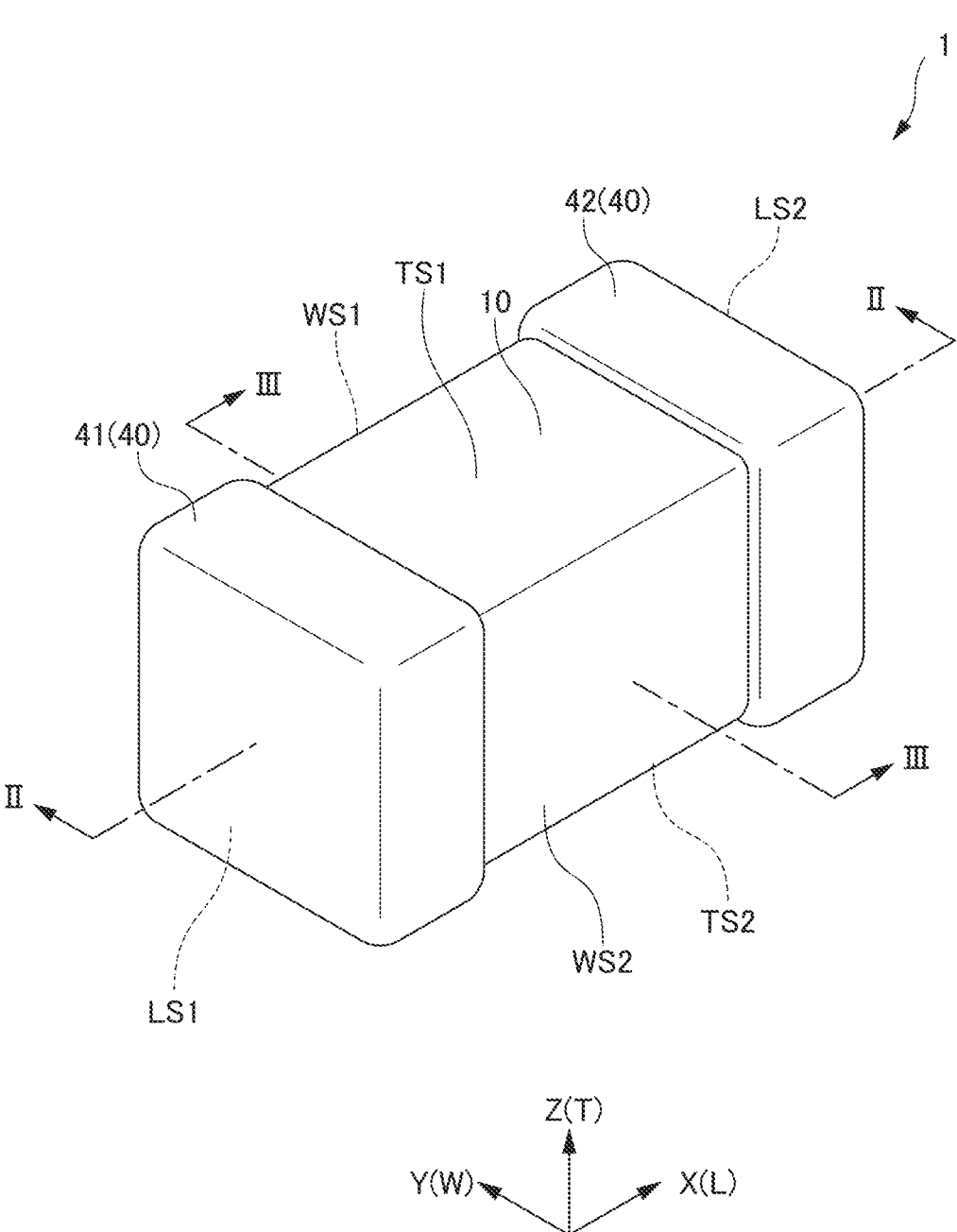
FIG. 1 is a perspective view of a multilayer ceramic capacitor according to an example embodiment of the present invention.

Hereinafter, multilayer ceramic capacitors according to example embodiments of the present invention will be described with reference to the drawings. However, the present invention is not limited thereto. In addition, the drawings may be schematically simplified and drawn in order to explain the contents of example embodiments of the present invention, and the ratio of the drawn components or the dimensions between the components may not coincide with the ratio of the dimensions described in the specification. Further, the components described in the specification may be omitted in the drawings, or the number of components may be omitted.

Multilayer Ceramic Capacitor

Figure 2:
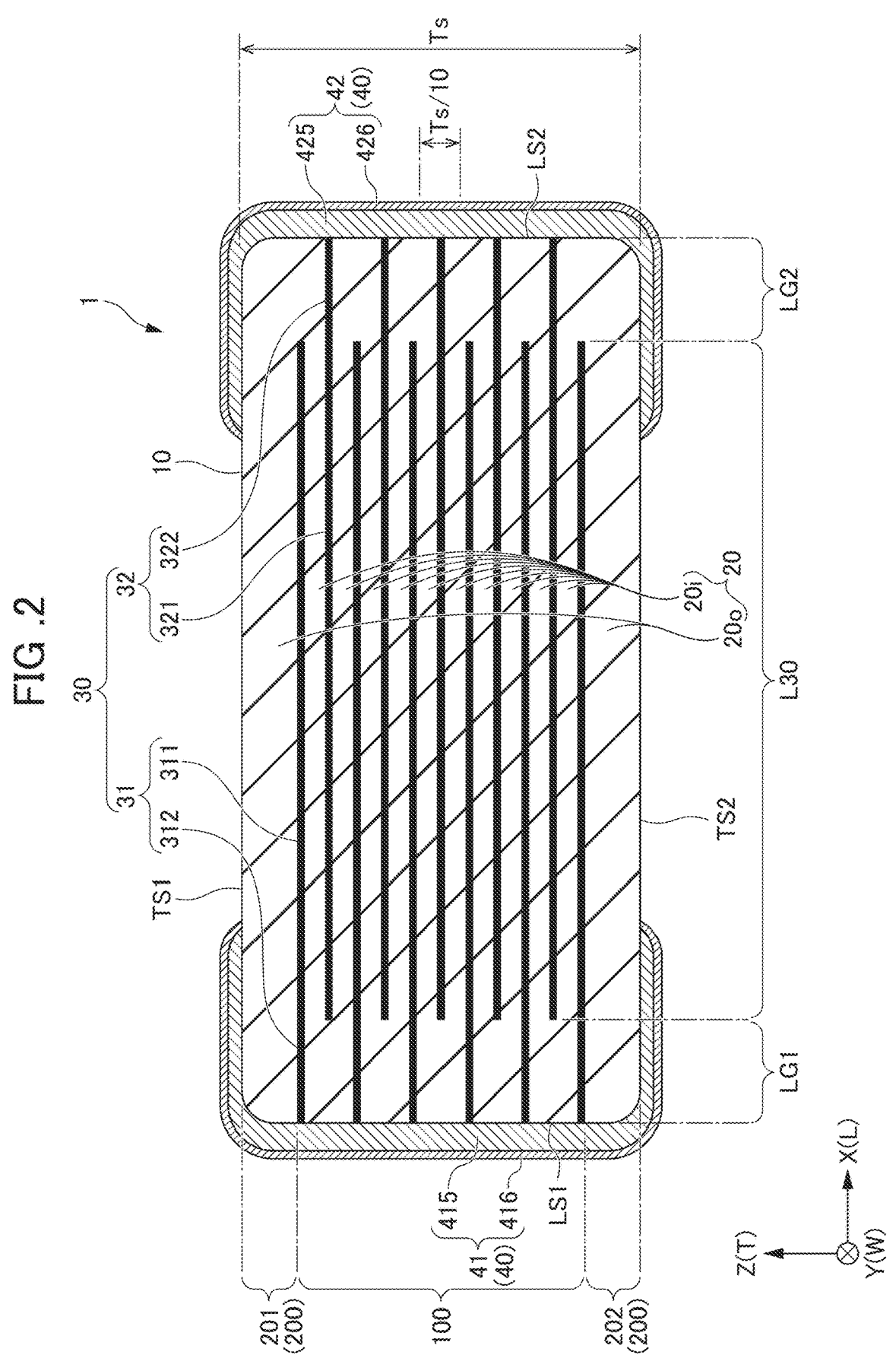
FIG. 2 is a cross-sectional view (LT cross-section) of the multilayer ceramic capacitor shown in FIG. 1 taken along the line II-II.
Figure 3:
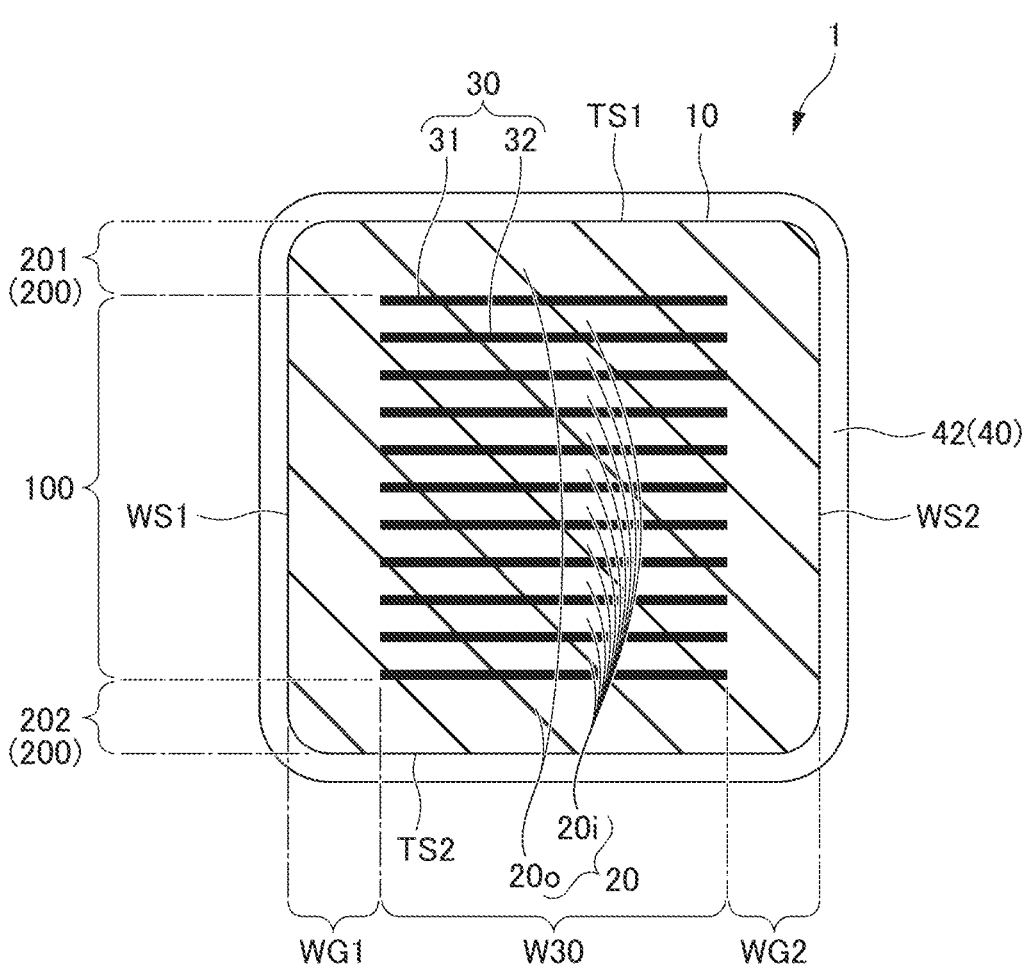
FIG. 3 is a cross-sectional view (WT cross-section) of the multilayer ceramic capacitor shown in FIG. 1 taken along the line III-III.
Figure 3:
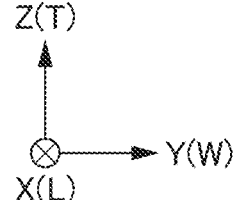
Figure 4:
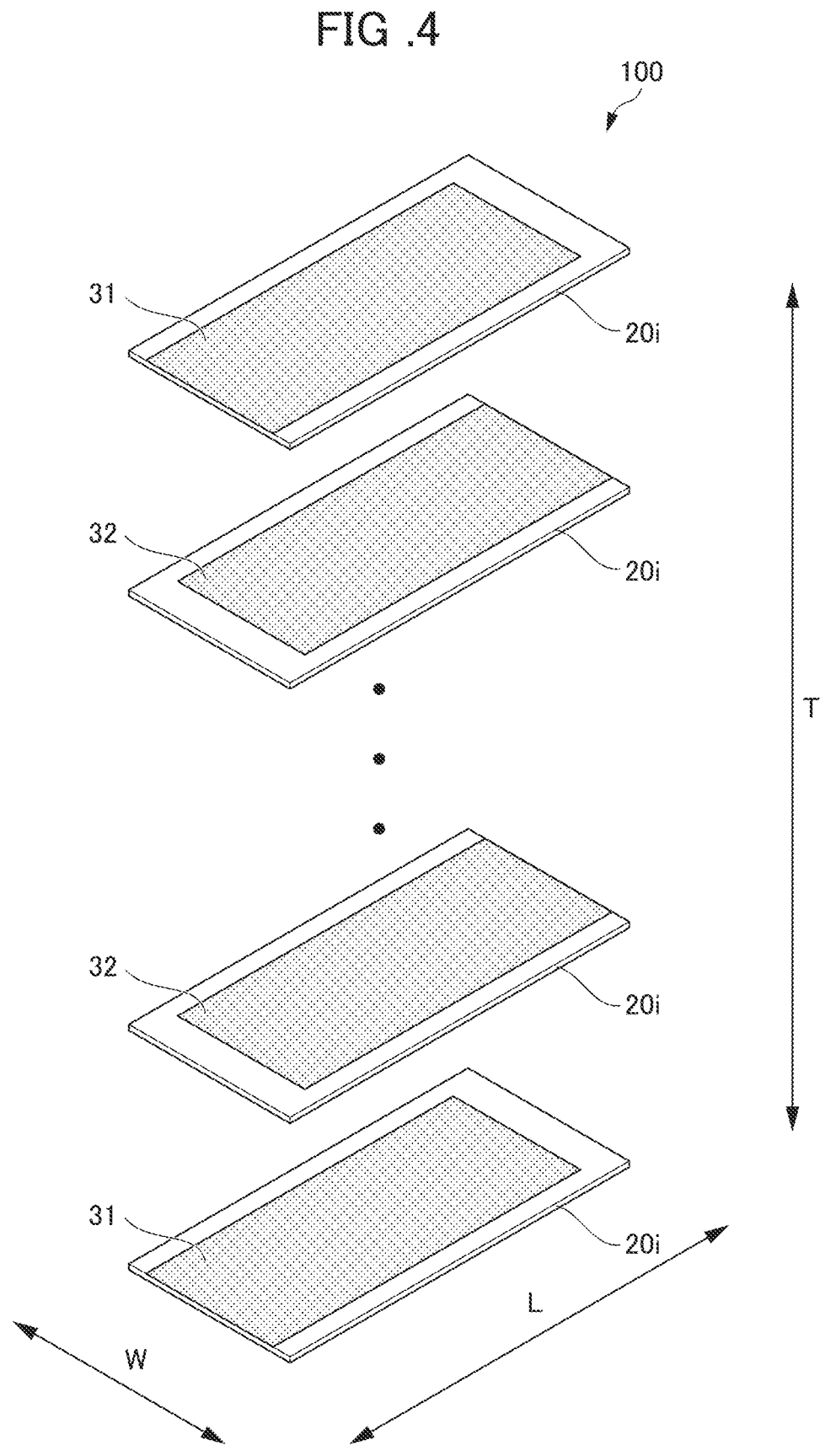

FIG. 1 is a perspective view of a multilayer ceramic capacitor. FIG. 2 is a cross-sectional view taken along the line II-II of the multilayer ceramic capacitor shown in FIG. 1. FIG. 3 is a cross-sectional view taken along the line III-III of the multilayer ceramic capacitor shown in FIG. 1. FIG. 4 is a schematic view of a structure of an inner layer portion of the multilayer ceramic capacitor shown in FIG. 1. The multilayer ceramic capacitor 1 shown in FIGS. 1 to 4 includes a multilayer body 10 and external electrodes 40. The external electrodes 40 include a first external electrode 41 and a second external electrode 42.

FIGS. 1 to 3 show XYZ orthogonal coordinate systems. The X direction refers to the length direction L of the multilayer ceramic capacitor 1 and the multilayer body 10. The Y direction refers to the width direction W of the multilayer ceramic capacitor 1 and the multilayer body 10. The Z direction refers to the lamination direction T of the multilayer ceramic capacitor 1 and the multilayer body 10. Thus, the cross section shown in FIG. 2 is also referred to as an LT cross section, and the cross section shown in FIG. 3 is also referred to as a WT cross section. The length direction L, the width direction W, and the lamination (stacking) direction T are not necessarily orthogonal to each other, and may intersect each other.

The size of the multilayer ceramic capacitor is preferably, for example, about 0.2 mm or more and about 10 mm or less in the length direction L, about 0.1 mm or more and about 10 mm or less in the width direction W, and about 0.1 mm or more and about 10 mm or less in the lamination direction T.

Multilayer Body

The multilayer body 10 has a rectangular or substantially rectangular parallelepiped shape, and includes a first main surface TS1 and a second main surface TS2 opposed to each other in the lamination direction T, a first lateral surface WS1 and a second lateral surface WS2 opposed to each other in the width direction W, and a first end surface LS1 and a second end surface LS2 opposed to each other in the length direction L. Each surface may be uneven or roughened.

The corner portions and ridge portions of the multilayer body 10 are preferably rounded. The corner portions are where the three surfaces of the multilayer body 10 intersect, and the ridge portions are where the two surfaces of the multilayer body 10 intersect.

As shown in FIGS. 2 and 3, the multilayer body 10 includes a plurality of inner dielectric layers 20i and a plurality of internal electrode layers 30 laminated in the lamination direction T. The multilayer body 10 includes an inner layer portion 100, and a first outer layer portion 201 and a second outer layer portion 202 sandwiching the inner layer portion 100 in the lamination direction T.

The plurality of inner dielectric layers 20i of the inner layer portion 100 and outer dielectric layers 20o of the outer layer portion 200 may include different component compositions because the inner layer portion 100 and the outer layer portions 200 have different functions. For example, the plurality of inner dielectric layers 20i are required to have a high permittivity, and the outer dielectric layers 20o are required to have high moisture resistance, weather resistance, and strength. Therefore, the dielectric layers of the inner layer portion 100 are described as the inner dielectric layers 20i, and the dielectric layers of the outer layer portions 200 are described as the outer dielectric layers 20o. However, when it is not necessary to specifically distinguish the inner dielectric layers 20i from the outer dielectric layers 20o, they may be collectively referred to as the dielectric layer 20.

Inner Layer Portion

FIG. 4 schematically shows the structure of the inner layer portion 100. The inner layer portion 100 includes the plurality of inner dielectric layers 20i and the plurality of internal electrode layers 30. In the inner layer portion 100, the plurality of internal electrode layers 30 are opposed to each other with the inner dielectric layer 20i interposed therebetween. The inner layer portion 100 generates capacitance and substantially defines and functions as a capacitor.

As a material of the dielectric layer 20, for example, a dielectric ceramic including $BaTiO_3$, $CaTiO_3$, $SrTiO_3$, $CaZrO_3$, or the like as a main component can be used. As a material of the dielectric layer 20, for example, a Mn compound, an Fe compound, a Cr compound, a Co compound, a Ni compound, or the like may be added as a subcomponent.

The thickness of each of the plurality of inner dielectric layer 20i is not particularly limited, but is preferably about 0.2 μm or more and about 15 μm or less, for example. By reducing the thickness of each of the inner dielectric layers 20i, the capacitance can be improved.

Outer Layer Portion

The first outer layer portion 201 is adjacent to the first main surface TS1 of the multilayer body 10. The second outer layer portion 202 is adjacent to the second main surface TS2 of the multilayer body 10. More specifically, the first outer layer portion 201 is provided between the first main surface TS1 and an internal electrode layer 30 closest to the first main surface TS1 among the plurality of internal electrode layers 30, and the second outer layer portion 202 is provided between the second main surface TS2 and an internal electrode layer 30 closest to the second main surface TS2 among the plurality of internal electrode layers 30. The first outer layer portion 201 and the second outer layer portion 202 do not include the internal electrode layer 30.

Each of the outer layer portions 200 is made of an insulating material. Each of the first outer layer portion 201 and the second outer layer portion 202 may include a plurality of outer dielectric layers 20o, but may include a single outer dielectric layer 20o. Further, the outer dielectric layer 20o may be made of the same type of dielectric material as the inner dielectric layer 20i, but may include a component different from the inner dielectric layer 20i depending on the desired function.

The plurality of internal electrode layers 30 includes a plurality of first internal electrode layers 31 and a plurality of second internal electrode layers 32. The plurality of first internal electrode layers 31 and the plurality of second internal electrode layers 32 are alternately provided in the lamination direction T of the multilayer body 10.

Each of the plurality of first internal electrode layers 31 includes a first counter electrode portion 311 and a first extension electrode portion 312, and each of the plurality of second internal electrode layers 32 includes a second counter electrode portion 321 and a second extension electrode portion 322.

The first counter electrode portion 311 and the second counter electrode portion 321 are opposed to each other with the inner dielectric layer 20*i* interposed therebetween in the lamination direction T of the multilayer body 10. The shapes of the first counter electrode portion 311 and the second counter electrode portion 321 are not particularly limited, and may be rectangular or substantially rectangular, for example. The first counter electrode portion 311 and the second counter electrode portion 321 are portions which substantially function as capacitors to generate capacitances.

Each of the first extension electrode portions 312 extends from the first counter electrode portion 311 toward the first end surface LS1 of the multilayer body 10, and is exposed at the first end surface LS1. Each of the second extension electrode portions 322 extends from the second counter electrode portion 321 toward the second end surface LS2 of the multilayer body 10, and is exposed at the second end surface LS2. The lengths of the first counter electrode portions 311 and the first extension electrode portions 312 in the width direction W may be the same or different. Further, the lengths of them in the width direction W may gradually change toward the first end surface LS1 at which the first extension electrode portions 312 are exposed. The lengths of the second counter electrode portions 321 and the second extension electrode portions 322 in the width direction W may be the same or different. Further, the lengths of them in the width direction W may gradually change toward the second end surface LS2 at which the second extension electrode portions 322 are exposed.

Thus, the first internal electrode layers 31 are each connected to the first external electrode 41, and an interval is provided between each of the first internal electrode layers 31 and the second end surface LS2 of the multilayer body 10, i.e., the second external electrode 42. The second internal electrode layers 32 are each connected to the second external electrode 42, and an interval is provided between each of the second internal electrode layers 32 and the first end surface LS1 of the multilayer body 10, i.e., the first external electrode 41.

The first internal electrode layers 31 and the second internal electrode layers 32 include, for example, metal Ni as a main component. The first internal electrode layers 31 and the second internal electrode layers 32 may include, for example, at least one of a metal such as Cu, Ag, Pd, Sn, or Au, or an alloy including at least one of these metals such as an Ag—Pd alloy as a main component, or may include a component other than the main component. Further, the first internal electrode layers 31 and the second internal electrode layers 32 may include dielectric particles having the same composition as the ceramic included in the inner dielectric layers 20*i* as components other than the main component. In this specification, the metal of the main component refers to a metal component having the highest weight %.

The thicknesses of the first internal electrode layers 31 and the second internal electrode layers 32 are not particularly limited, but are preferably about 0.2 μm or more and about 2.0 μm or less, and more preferably about 0.3 μm or more and about 0.35 μm or less, for example. The number of the first internal electrode layers 31 and the second internal electrode layers 32 is not particularly limited.

Examples of a method of measuring the thicknesses of the inner dielectric layers 20*i* and the internal electrode layers 30 include a method of observing, with a scanning electron microscope, an LT cross section in the vicinity of the middle portion in the width direction of the multilayer body exposed by polishing. Further, each value may be an average value of measurement values at a plurality of positions in the length direction, or may be an average value of measurement values at a plurality of positions in the lamination direction.

As shown in FIG. 3, the multilayer body 10 includes an electrode counter portion W30 in which the internal electrode layers 30 are opposed to each other in the width direction W, and a first side gap portion WG1 and a second side gap portion WG2 sandwiching the electrode counter portion W30. The first side gap portion WG1 is positioned between the electrode counter portion W30 and the first lateral surface WS1, and the second side gap portion WG2 is positioned between the electrode counter portion W30 and the second lateral surface WS2. More specifically, the first side gap portion WG1 is positioned between the end of the internal electrode layer 30 adjacent to the first lateral surface WS1 and the first lateral surface WS1, and the second side gap portion WG2 is positioned between the end of the internal electrode layer 30 adjacent to the second lateral surface WS2 and the second lateral surface WS2. The first side gap portion WG1 and the second side gap portion WG2 do not include the internal electrode layer 30, but rather include only the dielectric layer 20 or the plurality of dielectric layers 20. Each of the first side gap portion WG1 and the second side gap portion WG2 is also referred to as a W gap.

As shown in FIG. 2, the multilayer body 10 includes an electrode counter portion L30 in which the first internal electrode layers 31 and the second internal electrode layers 32 of the internal electrode layer 30 are opposed to each other in the length direction L, a first end gap portion LG1, and a second end gap portion LG2. The first end gap portion LG1 is positioned between the electrode counter portion L30 and the first end surface LS1, and the second end gap portion LG2 is positioned between the electrode counter portion L30 and the second end surface LS2. More specifically, the first end gap portion LG1 is positioned between the end of the second internal electrode layer 32 adjacent to the first end surface LS1 and the first end surface LS1, and the second end gap portion LG2 is positioned between the end of the first internal electrode layer 31 adjacent to the second end surface LS2 and the second end surface LS2. The first end gap portion LG1 does not include the second internal electrode layers 32 and includes the first internal electrode layers 31 and the inner dielectric layers 20*i*, and the second end gap portion LG2 does not include the first internal electrode layers 31 and includes the second internal electrode layers 32 and the inner dielectric layers 20*i*. The first end gap portion LG1 defines and functions as an extension electrode portion of each of the first internal electrode layers 31 which extends toward the first end surface LS1, and the second end gap portion LG2 defines and functions as an extension electrode portion of each of the second internal electrode layers 32 which extends toward the second end surface LS2. Each of the first end gap portion LG1 and the second end gap portion LG2 is also referred to as an L gap.

The first counter electrode portion 311 of each of the first internal electrode layers 31 and the second counter electrode portion 321 of each of the second internal electrode layers 32 are positioned in the electrode counter portion L30. The first extension electrode portion 312 of each of the first internal electrode layers 31 is positioned in the first end gap portion LG1, and the second extension electrode portion 322 of each of the second internal electrode layers 32 is positioned in the second end gap portion LG2.

Examples of a method of measuring the thickness of the multilayer body 10 include a method of observing, with a scanning electron microscope, an LT cross section in the vicinity of the middle portion in the width direction of the multilayer body exposed by polishing or a WT cross section in the vicinity of the middle portion in the length direction of the multilayer body exposed by polishing. Further, each value may be an average value of measurement values at a plurality of positions in the length direction or the width direction. Similarly, examples of a method of measuring the length of the multilayer body 10 include a method of observing, with a scanning electron microscope, an LT cross section in the vicinity of the middle portion in the width direction of the multilayer body exposed by polishing. Further, each value may be an average value of measurement values at a plurality of locations in the lamination direction. Similarly, examples of a method of measuring the width of the multilayer body 10 include a method of observing, with a scanning electron microscope, a WT cross section in the vicinity of the middle portion in the length direction of the multilayer body exposed by polishing. Further, each value may be an average value of measurement values at a plurality of locations in the lamination direction.

External Electrode

The external electrodes 40 includes a first external electrode 41 and a second external electrode 42.

The first external electrode 41 is provided on the first end surface LS1 of the multilayer body 10 and is connected to the first internal electrode layer 31. The first external electrode 41 may extend from the first end surface LS1 to a portion of the first main surface TS1 and a portion of the second main surface TS2. The first external electrode 41 may extend from the first end surface LS1 to a portion of the first lateral surface WS1 and a portion of the second lateral surface WS2.

The second external electrode 42 is provided on the second end surface LS2 of the multilayer body 10 and is connected to the second internal electrode layer 32. The second external electrode 42 may extend from the second end surface LS2 to a portion of the first main surface TS1 and a portion of the second main surface TS2. The second external electrode 42 may extend from the second end surface LS2 to a portion of the first lateral surface WS1 and a portion of the second lateral surface WS2.

The first external electrode 41 includes a first base electrode layer 415 and a first plated layer 416, and the second external electrode 42 includes a second base electrode layer 425 and a second plated layer 426. The first external electrode 41 may include only the first plated layer 416, and the second external electrode 42 may include only the second plated layer 426.

The first base electrode layer 415 and the second base electrode layer 425 may be fired layers including, for example, metal and glass. Examples of the glass include glass components including at least one of B, Si, Ba, Mg, Al, Li, and the like. As a specific example, borosilicate glass can be used. The metal includes, for example, Cu as a main component. The metal may include at least one of a metal such as, for example, Ni, Ag, Pd, or Au, or an alloy such as Ag—Pd alloy as a main component, or may include a component other than the main component.

The fired layer is obtained by applying an electrically conductive paste including a metal and glass to a multilayer body by, for example, a dipping method and firing the multilayer body. The fired layer may be fired after firing of the internal electrode layer, or may be fired simultaneously with the internal electrode layer. The fired layer may include a plurality of layers.

Alternatively, each of the first base electrode layer 415 and the second base electrode layer 425 may be, for example, a resin layer including electrically conductive particles and a thermosetting resin. The resin layer may be provided on the fired layer described above, or may be provided directly on the multilayer body without the fired layer.

The resin layer is a layer obtained by applying an electrically conductive paste including, for example, electrically conductive particles and a thermosetting resin to a multilayer body by a coating method and firing the multilayer body. The resin layer may be fired after firing of the internal electrode layer, or may be fired simultaneously with the internal electrode layer. The resin layer may include a plurality of layers.

The thickness per layer of each of the first base electrode layer 415 and the second base electrode layer 425 defining and functioning as the fired layer or the resin layer is not particularly limited, and may be, for example, about 2 μm or more and about 220 μm or less.

Alternatively, each of the first base electrode layer 415 and the second base electrode layer 425 may be formed by a thin film formation method such as, for example, a sputtering method or a vapor deposition method, and may be a thin film layer having a thickness of, for example, about 1 μm or less in which metal particles are deposited.

The first plated layer 416 covers at least a portion of the first base electrode layer 415, and the second plated layer 426 covers at least a portion of the second base electrode layer 425. Examples of the first plated layer 416 and the second plated layer 426 include at least one of a metal such as Cu, Ni, Ag, Pd, or Au, or an alloy such as an Ag—Pd alloy.

Each of the first plated layer 416 and the second plated layer 426 may include a plurality of layers. A two-layer configuration of, for example, Ni plating and Sn plating is preferable. The Ni plated layer can prevent the base electrode layer from being eroded by the solder when the ceramic electronic component is mounted, and the Sn plated layer can improve wettability of the solder when the ceramic electronic component is mounted and can be easily mounted. The first plated layer 416 and the second plated layer 426 may include a three-layer configuration by laminating, for example, Cu plating, Ni plating, and Sn plating, respectively. The outermost layer may be plated with Au, for example.

The thickness per layer of each of the first plated layer 416 and the second plated layer 426 is not particularly limited, and may be, for example, about 1 μm or more and about 10 μm or less.

Porosity

In the multilayer ceramic capacitor 1 according to the present example embodiment, when viewed in the LT cross section parallel or substantially parallel to the length direction L and the lamination direction T, the inner layer dielectric layers 20i include a middle region provided at a middle portion in the length direction L and end regions provided at end portions in the length direction L. Here, the middle region is positioned in the middle when the electrode counter portion L30 is divided into three equal or substantially equal portions in the length direction L. Each of the end regions is located in a range excluding the middle region when the electrode counter portion L30 is divided into three equal or substantially equal portions in the length direction L.

Figure 5:
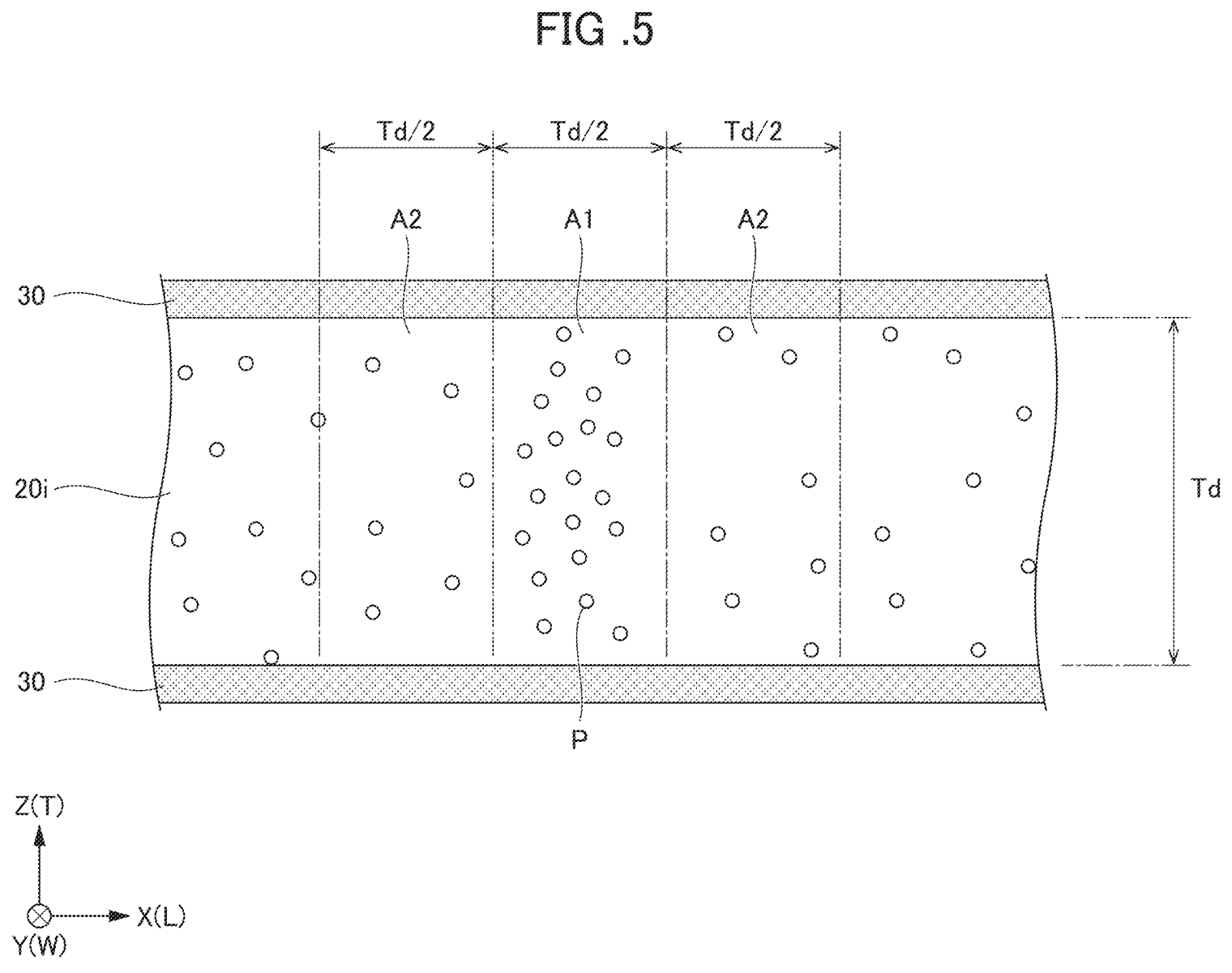

As shown in FIG. 5, when the thickness of the inner dielectric layer 20$i$ in the lamination direction T is defined as Td, the middle region of the inner dielectric layer 20$i$ includes a rectangular or substantially rectangular region A1 in which the dimension in the length direction L is defined as Td/2 and the dimension in the lamination direction is defined as Td, and rectangular or substantially rectangular regions A2 each adjacent to the region A1 and in each of which the dimension in the length direction is defined as Td/2 and the dimension in the lamination direction T is defined as Td. The region A1 has a higher porosity than the other regions, and the difference between the porosity P1 in the region A1 and the porosity P2 in each of the regions A2 is, for example, about 1% or more and about 5% or less.

In the inner dielectric layer 20$i$, a portion where a large amount of voids P exists has lower strength than the other portions. For this reason, when a large number of voids P exists at locations where electrostriction stress is concentrated, cracks are likely to occur starting from the voids. In particular, when a region having a large difference in density exists in the inner dielectric layer 20$i$ due to the distribution state of the voids, stress concentrates in a rough region with a large number of voids. As shown in FIG. 5, the multilayer ceramic capacitor according to the present example embodiment includes, in the middle region of the inner dielectric layer 20$i$, the rectangular or substantially rectangular region A1 in which the dimension in the length direction L is defined as Td/2 and the dimension in the lamination direction is defined as Td, and the rectangular or substantially rectangular regions A2 each adjacent to the region A1 and in each of which the dimension in the length direction is defined as Td/2 and the dimension in the lamination direction T is defined as Td. The difference between the porosity P1 in the region A1 and the porosity P2 in each of the regions A2 is, for example, about 1% or more and about 5% or less, such that it is possible to reduce the difference in the density of the voids and to reduce the occurrence of electrostriction cracks. The difference between the porosity P1 and the porosity P2 is set to, for example, about 1% or more and about 5% or less. However, when it is less than about 1%, it is not suitable for mass production depending on manufacturing conditions. On the other hand, when the porosity exceeds about 5%, the advantageous effects of reducing or preventing the occurrence of electrostriction cracks decreases.

As shown in FIG. 2, when the height of the multilayer body 10 in the lamination direction T is defined as Ts, it is preferable that the region A1 and each of the regions A2 exist in the range of the height of about Ts/10 positioned in the middle in the lamination direction T of the multilayer body 10.

The electrostriction stress in the multilayer ceramic capacitor tends to concentrate in the middle of the multilayer body 10 in the lamination direction T. Therefore, in the inner dielectric layer 20$i$ existing in the range of the height of about Ts/10 positioned in the middle in the lamination direction T of the multilayer body 10, it is effective to reduce the difference in density due to voids in order to reduce the occurrence of electrostriction cracks. Therefore, in the inner dielectric layer 20$i$ located in the middle in the lamination direction T of the multilayer body 10 and existing in the range of the height of about Ts/10, by setting the difference between the porosity P1 of the region A1 and the porosity P2 of the region A2 to about 18 or more and about 5% or less, it is possible to more efficiently reduce the occurrence of electrostriction cracks.

Porosity Measurement

Examples of a method of measuring the porosity include a method of observing, with a scanning electron microscope (SEM), an LT cross section in the middle in the width direction W of the multilayer body 10 exposed by polishing. The captured SEM image is binarized to identify the void P. Then, based on the area of the target region in the SEM image and the area of the void P in the target region, the porosity is calculated by the following expression (1). For example, the observation range is set to about 10 μm×about 10 μm, and the porosity is calculated by analyzing the target region within the observation range. Porosity (%)=(area of void/area of target region)×100 (1)

Manufacturing of Multilayer Ceramic Capacitor

Next, an example of a method of manufacturing a multilayer ceramic capacitor according to an example embodiment of the present invention will be described.

First, a ceramic green sheet for forming a dielectric layer and an electrically conductive paste for internal electrodes are prepared. The electrically conductive paste for forming internal electrodes includes a binder and a solvent, and known organic binders and organic solvents can be used. The electrically conductive paste for internal electrodes forms the internal electrode layers.

Next, an electrically conductive paste for forming internal electrodes is printed on the ceramic green sheet in a predetermined pattern by, for example, screen printing or gravure printing, thus forming an internal electrode pattern.

Next, a predetermined number of ceramic green sheets for forming the outer layer on which no internal electrode pattern is formed are laminated, ceramic green sheets having internal electrodes formed thereon are sequentially laminated, and a predetermined number of ceramic green sheets for forming the outer layer is laminated thereon, thus manufacturing a multilayer sheet. The ceramic green sheets form the dielectric layers 20 of the multilayer ceramic capacitor 1.

The obtained multilayer sheets are pressed in the lamination direction by, for example, hydrostatic pressing or the like to prepare a multilayer block. Next, the multilayer block is cut into a predetermined size, and the multilayer chip is cut out. At this time, the corner portions and ridge portions of the multilayer chip may be rounded by, for example, barrel polishing or the like.

Further, the multilayer chip is fired to form the multilayer body 10. The firing temperature at this time is preferably, for example, about 900° C. or higher and about 1300° C. or lower, although it depends on the material of the dielectric and the internal electrode.

The firing of the multilayer chip is performed by sequentially applying pressure from the middle portion of the multilayer chip toward both end portions. The distribution of the voids in the dielectric layer is controlled by, for example, adjusting the pressure applied to the multilayer chip, the moving speed of the portion to which the pressure is applied, the firing temperature, and the firing time.

Next, by dipping the first end surface LS1 of the multilayer body 10 in an electrically conductive paste which is an electrode material for the base electrode layer, the electrically conductive paste for forming the first base electrode layer 415 is applied to the first end surface LS1. Similarly, by dipping the second end surface LS2 of the multilayer body 10 in an electrically conductive paste which is an electrode material for the base electrode layer, the electrically conductive paste for forming the second base electrode layer 425 is applied to the second end surface LS2. After that, these electrically conductive pastes are fired, such that the first base electrode layer 415 and the second base electrode layer 425, which are fired layers, are formed. The firing temperature is preferably, for example, about 600° C. or higher and about 900° C. or lower.

As described above, the first base electrode layer 415 and the second base electrode layer 425, which are resin layers, may be formed by applying an electrically conductive paste containing electrically conductive particles and a thermosetting resin by a coating method and firing, or the first base electrode layer 415 and the second base electrode layer 425, which are thin films, may be formed by a thin film formation method such as, for example, a sputtering method or an vapor deposition method.

Then, the first plated layer 416 is formed on the surface of the first base electrode layer 415 to form the first external electrode 41, and the second plated layer 426 is formed on the surface of the second base electrode layer 425 to form the second external electrode 42. Through the above steps, the multilayer ceramic capacitor 1 is obtained.

EXAMPLES

Electrostriction Test (Evaluation of Crack Detection)

The multilayer ceramic capacitor was subjected to an electrostriction test. According to the above-described manufacturing method, samples whose manufacturing conlevels), the number of samples n (20 pieces) for porosity measurement and the number of samples n (100 pieces) for electrostriction test were taken out from the same lot and prepared. In the porosity measurement, the average value of the measurement results was used for evaluation.

The electrostriction test of the multilayer ceramic capacitor was performed by using a B.D.V. device and increasing the voltage to about DC 150 V at a voltage raising rate of about 100 V/sec. The sample was evaluated by observing the presence or absence of cracks using an ultrasonic testing apparatus. Specifically, first, the multilayer ceramic capacitors as samples were aligned so that their main surfaces faced the upper surface. Next, the upper surfaces of the aligned multilayer ceramic capacitors were irradiated with ultrasonic waves using an ultrasonic probe and scanned. The presence or absence of cracks was confirmed by observing the reflected wave of the ultrasonic wave at this time, and detecting the reflected wave returned earlier than the bottom wave. The number of samples n=100 in the same lot was used as a parameter, and the crack occurrence rate was calculated.

The criteria for the determination were "o" (pass) when the crack occurrence rate was about 10% or less, and "x" (failure) when the crack occurrence rate was more than about 10%. The results are shown in Table 1.

TABLE 1

| | DIMENSIONS OF MULTILAYER BODY | | | INTERNAL DIELECTRIC LAYER | POROSITY | | | B.D.V. CRACK OCCURRENCE | |
|---|---|---|---|---|---|---|---|---|---|
| | L [mm] | W [mm] | T [mm] | Td [μm] | P1 [%] | P2 [%] | P1 − P2 [%] | RATIO [%] | EVALUATION |
| 02 SIZE | 0.20 | 0.10 | 0.10 | 3.1 | 2.1 | 1.0 | 1.1 | 1 | o |
| | | | | | 3.5 | 0.9 | 2.6 | 5 | o |
| | | | | | 5.9 | 1.0 | 4.9 | 7 | o |
| | | | | | 6.5 | 1.0 | 5.5 | 12 | x |
| 15 SIZE | 1.00 | 0.50 | 0.50 | 3.2 | 2.3 | 1.3 | 1.0 | 2 | o |
| | | | | | 4.0 | 1.2 | 2.8 | 5 | o |
| | | | | | 6.4 | 1.4 | 5.0 | 8 | o |
| | | | | | 6.4 | 1.2 | 5.2 | 12 | x |
| 18 SIZE | 1.60 | 0.80 | 0.80 | 3.1 | 2.6 | 1.4 | 1.2 | 3 | o |
| | | | | | 4.5 | 1.5 | 3.0 | 6 | o |
| | | | | | 6.3 | 1.5 | 4.8 | 7 | o |
| | | | | | 7.4 | 1.6 | 5.8 | 14 | x |
| 32 SIZE | 3.20 | 2.50 | 2.50 | 3.1 | 3.2 | 2.1 | 1.1 | 2 | o |
| | | | | | 5.2 | 2.1 | 3.1 | 5 | o |
| | | | | | 6.9 | 2.0 | 4.9 | 8 | o |
| | | | | | 7.5 | 2.2 | 5.3 | 15 | x |
| 55 SIZE | 5.70 | 5.00 | 5.00 | 3.2 | 3.8 | 2.5 | 1.3 | 3 | o |
| | | | | | 5.8 | 2.4 | 3.4 | 6 | o |
| | | | | | 7.6 | 2.6 | 5.0 | 9 | o |
| | | | | | 8.3 | 2.7 | 5.6 | 15 | x | ditions were adjusted so that the distribution of voids were different were manufactured in lot units as samples at each experimental level. The samples in each lot were manufactured under the same or substantially the same design and the same or substantially the same manufacturing conditions. For each experimental level (chip size: 5 types×4

As shown in Table 1, it was confirmed that good results were obtained when the difference between the porosity P1 in the region A1 and the porosity P2 in the region A2 was about 18 or more and about 5% or less.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including an inner layer portion including a plurality of inner dielectric layers and a plurality of internal electrode layers alternately laminated in a lamination direction, outer layer portions sandwiching the inner layer portion in the lamination direction, a first main surface and a second main surface opposed to each other in the lamination direction, a first lateral surface and a second lateral surface opposed to each other in a width direction orthogonal or substantially orthogonal to the lamination direction, and a first end surface and a second end surface opposed to each other in a length direction orthogonal or substantially orthogonal to the lamination direction and the width direction; and
a pair of external electrodes covering at least the first end surface and the second end surface and being connected to the plurality of internal electrode layers; wherein
when viewed in a cross section parallel or substantially parallel to the length direction and the lamination direction, each of the plurality of inner dielectric layers includes a middle region at a middle portion in the length direction and end regions at end portions in the length direction;
when a thickness of each of the plurality of inner dielectric layers in the lamination direction is defined as Td, the middle region includes a rectangular or substantially rectangular region A1 in which a dimension in the length direction is defined as Td/2 and a dimension in the lamination direction is defined as Td, and rectangular or substantially rectangular regions A2 each adjacent to the region A1 and in each of which a dimension in the length direction is defined as Td/2 and a dimension in the lamination direction is defined as Td, the region A1 has a higher porosity than other regions, and a difference between a porosity P1 in the region A1 and a porosity P2 in each of the region A2 is about 1% or more or less; and
each of the region A1 and the regions A2 overlaps with at least one of the plurality of internal electrode layers in the lamination direction.

2. The multilayer ceramic capacitor according to claim 1, wherein, when a height of the multilayer body in the lamination direction is defined as Ts, the region A1 and each of the regions A2 are provided in a range of a height of about Ts/10 positioned in a middle portion of the multilayer body in the lamination direction.

3. The multilayer ceramic capacitor according to claim 1, wherein dimensions of the multilayer ceramic capacitor are about 0.2 mm or more and about 10 mm or less in the length direction, about 0.1 mm or more and about 10 mm or less in the width direction, and about 0.1 mm or more and about 10 mm or less in the lamination direction.

4. The multilayer ceramic capacitor according to claim 1, wherein corner portions and ridge portions of the multilayer body are rounded.

5. The multilayer ceramic capacitor according to claim 1, wherein each of the plurality of inner dielectric layers includes $BaTiO_3$, $CaTiO_3$, $SrTiO_3$, of $CaZrO_3$ as a main component.

6. The multilayer ceramic capacitor according to claim 5, wherein each of the plurality of inner dielectric layers includes a Mn compound, an Fe compound, a Cr compound, a Co compound, or a Ni compound as a subcomponent.

7. The multilayer ceramic capacitor according to claim 1, wherein a thickness of each of the plurality of inner dielectric layers is about 0.2 μm or more and about 15 μm or less.

8. The multilayer ceramic capacitor according to claim 1, wherein each of the plurality of internal electrode layers includes at least one of Cu, Ag, Pd, Sn, or Au, or an alloy including at least one of Cu, Ag, Pd, Sn, or Au.

9. The multilayer ceramic capacitor according to claim 1, wherein a thickness of each of the plurality of internal electrode layers is about 0.2 μm or more and about 2.0 μm.

10. The multilayer ceramic capacitor according to claim 1, wherein a thickness of each of the plurality of internal electrode layers is about 0.3 μm or more and about 0.35 μm or less.

11. The multilayer ceramic capacitor according to claim 1, wherein each of the pair of first and second electrodes includes a base electrode layer and a plated layer.

12. The multilayer ceramic capacitor according to claim 11, wherein the base electrode layer includes metal and glass.

13. The multilayer ceramic capacitor according to claim 12, wherein a glass component of the glass of the base electrode layer includes at least one of B, Si, Ba, Mg, Al, or Li.

14. The multilayer ceramic capacitor according to claim 11, wherein the metal of the base electrode layer includes at least one of Ni, Ag, Pd, or Au, or an alloy including at least one of Ni, Ag, Pd, or Au.

15. The multilayer ceramic capacitor according to claim 11, wherein a thickness of the base electrode layer is about 2 μm or more and about 220 μm or less.

16. The multilayer ceramic capacitor according to claim 11, wherein the plated layer includes at least one of Cu, Ni, Ag, Pd, or Au, or an alloy including at least one of Cu, Ni, Ag, Pd, or Au.

17. The multilayer ceramic capacitor according to claim 11, wherein the plated layer includes a Ni plating and a Sn plating.

18. The multilayer ceramic capacitor according to claim 11, wherein the plated layer includes a Cu plating, a Ni plating, and a Sn plating.

* * * * *